US008503065B2

(12) United States Patent
Hsieh et al.

(10) Patent No.: US 8,503,065 B2

(45) Date of Patent: Aug. 6, 2013

(54) ELECTROPHORETIC DISPLAY STRUCTURE

(75) Inventors: Ming-Che Hsieh, Hsin-Chu (TW); Shih-Hsing Hung, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/234,431

(22) Filed: Sep. 16, 2011

(65) Prior Publication Data

US 2012/0087002 A1 Apr. 12, 2012

(30) Foreign Application Priority Data

Oct. 8, 2010 (TW) .............................. 99134325 A

(51) Int. Cl.
*G02B 26/00* (2006.01)
*G09G 3/34* (2006.01)

(52) U.S. Cl.
USPC .......................................... 359/296; 345/107

(58) Field of Classification Search
USPC .................................. 359/295–298; 345/107
See application file for complete search history.

(56) References Cited

U.S. PATENT DOCUMENTS

| | | | |
|---|---|---|---|
| 6,982,178 B2 | 1/2006 | LeCain et al. | |
| 7,554,712 B2 | 6/2009 | Patry et al. | |
| 2004/0080704 A1 | 4/2004 | Jung et al. | |
| 2007/0152956 A1 | 7/2007 | Danner et al. | |
| 2009/0109520 A1 | 4/2009 | Park et al. | |
| 2012/0013970 A1* | 1/2012 | Shin et al. | 359/296 |

* cited by examiner

*Primary Examiner* — Mahidere Sahle

(74) *Attorney, Agent, or Firm* — McClure, Qualey & Rodack, LLP

(57) ABSTRACT

An electrophoretic display structure includes a substrate, an activation layer, an electrophoretic display layer, a protective layer, a first sealant, and a second sealant. The activation layer is disposed on the substrate while the electrophoretic display layer is disposed on the activation layer. The electrophoretic display layer has a plurality of electrophoretic display elements and a waterproof layer disposed on the electrophoretic display elements. The protective layer is disposed on the electrophoretic display elements. The protective layer is disposed on the waterproof layer, and the first sealant is disposed between the activation layer and the protective layer to fill in the sides of the electrophoretic display layer. The second sealant covers the outer side of the first sealant and connects with the activation layer and the protective layer. The viscosity of the first sealant in liquid state is lower than the viscosity of the second sealant in liquid state.

18 Claims, 6 Drawing Sheets

200 300 210 250 302 700 700 500 500 110 100

ELECTROPHORETIC DISPLAY STRUCTURE

BACKGROUND OF THE INVENTION

1. Field of the Invention

The present invention generally relates to a flat panel display device that is light, slim, flexible, and portable. Particularly, the present invention relates to an application of electrophoretic display (EPD) technology in an electrophoretic display structure of electronic paper displays.

2. Description of the Related Art

Not only are Electronic-books (E-books) advantageous in simultaneously possessing display qualities of conventional paper as well as possessing the property of being mechanical and flexible in nature, Electronic-books (E-books) are also further advantageous for having integrated the real-time updating characteristic of digital electronic medias. Consequently, electronic paper displays are gradually becoming more commonly accepted by the consumer and are at the forefront in replacing conventional paper in the near future.

FIG. 1 is a schematic diagram of the conventional electrophoretic display structure utilizing electrophoretic display technologies. The conventional electrophoretic display structure includes a substrate 10, an electrophoretic display layer 30, a protective layer 40, and an edge sealant 50. As shown in FIG. 1, the electrophoretic display layer 30 further includes a waterproof layer 20 and a plurality of electrophoretic display elements 35 and is then connected to an activation layer 15 and the substrate 10. The electrophoretic display layer 30 is driven by the activation layer 15 to force the electrically charged electrophoretic display elements 35 to change positions in order to exhibit the contrast between the elements and the substrate 10 or the contrast of the color differences between the elements themselves. In turn, the contrast forms a pixelated image for displaying purposes. Within the boundaries of the edge sealant 50 surrounding the exterior of the electrophoretic display layer 30, a gap 25 exists between the activation layer 15 and the protective layer 40. The gap 25 may be used for sealants for filling or padding purposes.

In terms of the edge sealant 50 with low viscosity, the conventional electrophoretic display structure is customarily lacking in waterproofing abilities as water vapor can easily infiltrate the electrophoretic display layer 30 during the quality assurance or assembling stage, resulting in abnormal activation operation of the electrophoretic display elements 35. On the other hand, if the edge sealant 50 has high viscosity, the gap 25 cannot be easily filled. After the curing process, any gas that was left behind in the gap 25 would have expanded out of the plastic frame 50 and left formations of bubbles or holes.

SUMMARY OF THE INVENTION

It is an object of the present invention to provide an electrophoretic display structure to prevent infiltration of water vapor and the manufacturing method thereof.

It is another object of the present invention to provide an electrophoretic display structure utilizing a double layered structure to prevent infiltration of water vapor and the manufacturing method thereof.

The present invention provides an electrophoretic display structure including a substrate, an activation layer, an electrophoretic display layer, a protective layer, a first sealant, and a second sealant. The activation layer is disposed on the substrate while the electrophoretic display layer is disposed on the activation layer. The electrophoretic display layer has a waterproof layer and a plurality of electrophoretic display elements, wherein the waterproof layer is disposed on the electrophoretic display elements and has a dimension greater than or equal to the dimension of the electrophoretic display element. The protective layer, disposed on the waterproof layer, has a dimension greater than the dimension of the waterproof layer. The first sealant, disposed between the activation layer and the protective layer, forms a frame-like structure by filling and surrounding the sides of the electrophoretic display layer. The second sealant, covering an outer side of the first sealant, connects with the activation layer and the protective layer. The viscosity of the first sealant in liquid state is lower than the viscosity of the second sealant in liquid state.

In the preferred embodiment, the water vapor transmission rate (WVTR) of the first sealant is higher than the water vapor transmission rate of the second sealant. The protective layer and the second sealant connected to the protective layer are flushed on the side with the second sealant covering the surface of the protective layer. One side of the first sealant is flush with one side of the protective layer. In other words, the projection onto the protective layer of the one side of the first sealant lines up with the one side of the protective layer. In essence, the one side of the first sealant is on the same plane as the one side of the protective layer. The viscosity of the first sealant is preferably smaller than or equal to 5000 cp, while the viscosity of the second sealant is preferably greater than or equal to 15000 cp.

The present invention also provides an electrophoretic display structure manufacturing method including the following steps. Firstly, the activation layer is formed on the substrate. Next, the electrophoretic display layer is disposed on the activation layer, wherein the waterproof layer/protective layer is disposed on the electrophoretic display layer. The first sealant is then filled in between the activation layer and the protective layer as well as filling into the sides of the electrophoretic display layer. Lastly, the second sealant covers the outer side of the first sealant and connects with the activation layer and the protective layer, wherein the viscosity of the first sealant in liquid state is lower than the viscosity of the second sealant in liquid state.

DETAILED DESCRIPTION OF THE PREFERRED EMBODIMENT

Figure 1:
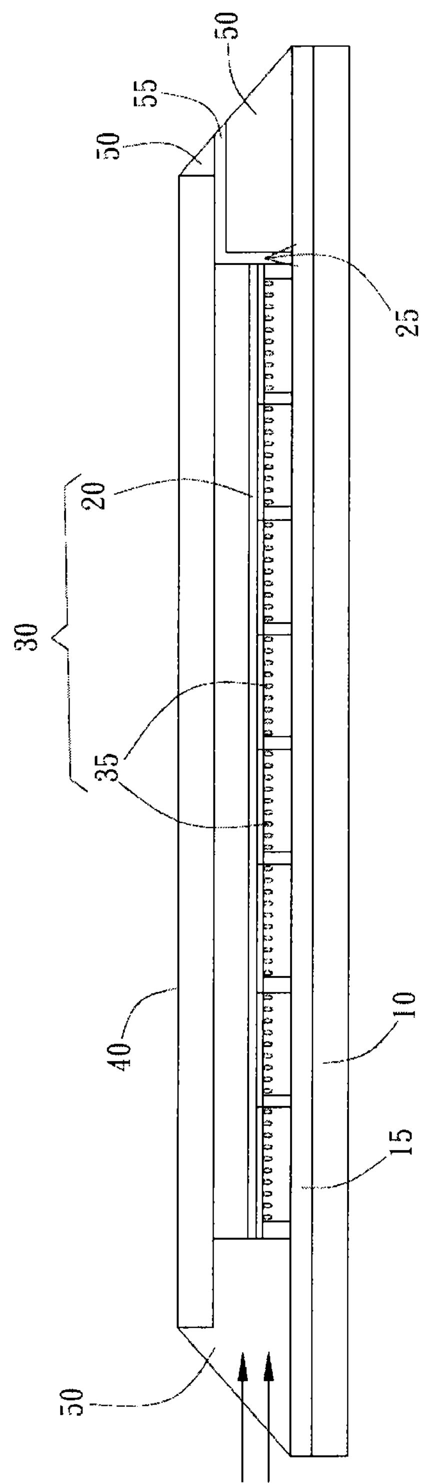
FIG. 1 is a cross-sectional view of the conventional electrophoretic display structure.
Figure 2A:
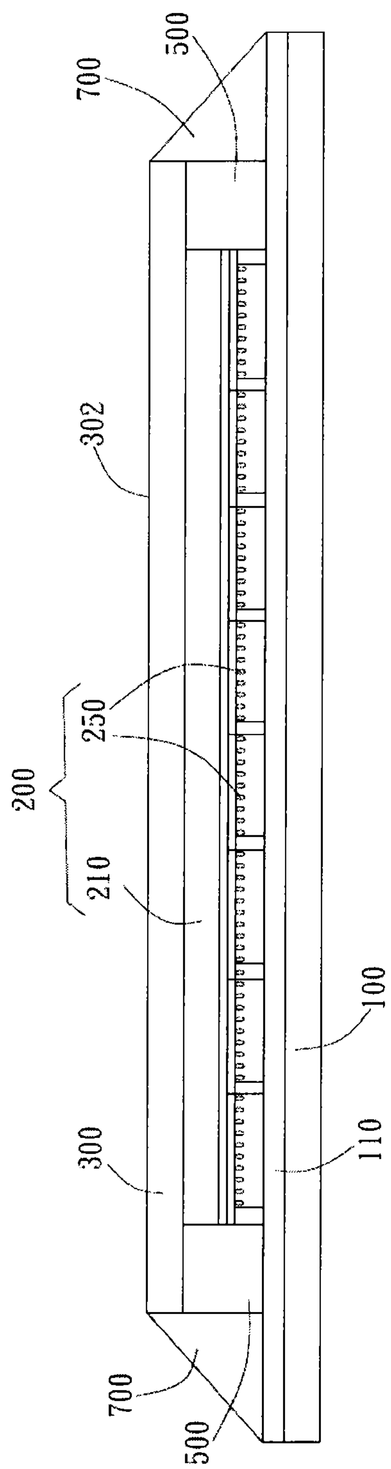
FIG. 2A is a cross-sectional view of an embodiment of the present invention.
Figure 2B:
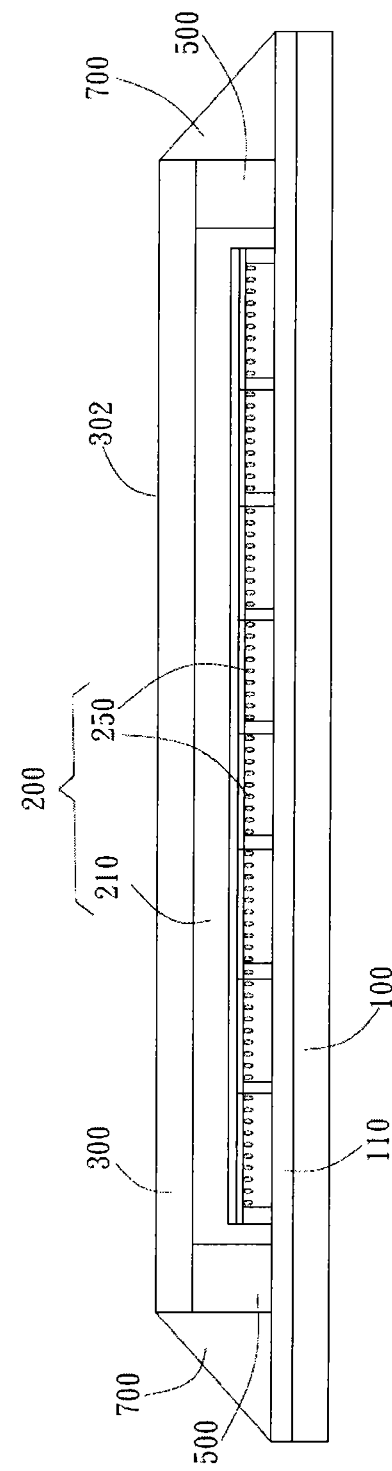
FIG. 2B is a cross-sectional view of another embodiment of the present invention.

As shown in FIG. 2A, the electrophoretic display structure of the present invention includes a substrate 100, an activation layer 110, an electrophoretic display layer 200, a protective layer 300, a first sealant 500, and a second sealant 700. The activation layer 110 is disposed on the substrate 100 while the electrophoretic display layer 200 is disposed on the activation layer 110. The substrate 100 preferably includes glass, organic films, flexible films, or any other suitable materials. The electrophoretic display layer 200 has a waterproof layer 210 and a plurality of electrophoretic display elements 250, wherein the waterproof layer 210 is disposed on the electrophoretic display elements. The dimension of the waterproof layer 210 is preferably the same as the dimension of the electrophoretic display layer 200, wherein the electrophoretic display layer 200 is preferably stacked and aligned on the waterproof layer 210. However, as shown in the embodiment in FIG. 2B, the dimension of the waterproof layer 210 may be greater than the dimension of the electrophoretic display layer 200, allowing the waterproof layer 210 to cover the sides of the electrophoretic display layer 200. The electrophoretic display elements 250 utilize principles of electrophoretic displays. In other words, electrically charged electrophoretic display elements suspended in specific electrophoretic liquids are activated by an external electrical source in order to utilize the change in positions of the electrophoretic display elements to exhibit a contrast between the elements and the liquid/backboard or to exhibit a color contrast among the elements. In turn, the objective of displaying an image formed from the contrasts may be accomplished.

The protective layer 300 is disposed on the waterproof layer 210 while the first sealant, disposed between the activation layer 110 and the protective layer 300, fills the sides of the electrophoretic display layer 200. The dimension of the protective layer 300 is preferably greater than the dimension of the electrophoretic display layer 200. When viewed from the projection direction of the electrophoretic display structure of the present invention, all sides of the protective layer 300 evenly surround the outer sides of the electrophoretic display layer 200. In addition, the dimension of the protective layer 300 is also greater than the dimension of the waterproof layer 210. In the present embodiment, the activation layer 110 is preferably an active matrix to actively provide voltage for the electrophoretic display elements 250. However, in other different embodiments, the activation layer 110 may be a segment layer activating backboard, a passive matrix, or any other suitable activation device based on the employed technologies and the application of displays. The waterproof layer 210 is preferably formed of Polyethylene Terephthalate (PET), plastics, or any other suitable compounds formed from thermoplastic resins as the base and complemented with inorganic oxides such as silicon dioxide ($SiO_2$). The protective layer 300 is preferably a transparent cover layer that has properties of being anti-scratch, anti-grind, anti-glare, and anti-impact.

Figure 3:
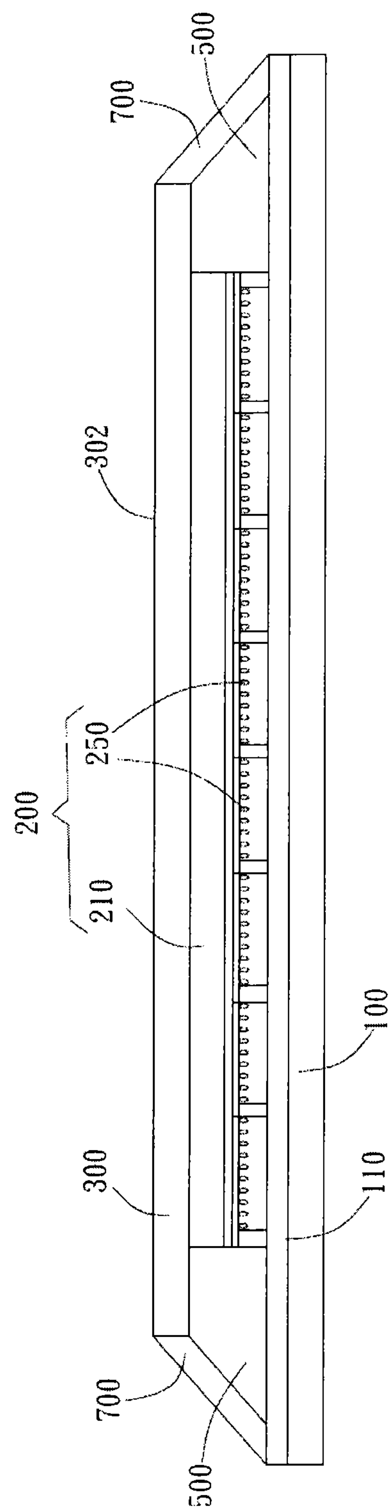
FIG. 3 is a cross-sectional view of an embodiment of the electrophoretic display structure of the present invention.

As shown in the embodiment in FIG. 2A, one side of the first sealant 500 is preferably flush with one side of the protective layer 300 while the other side of the first sealant 500 is connected with the side of the waterproof layer 210 and the side of the electrophoretic display element 250. In other words, the projection of the one side of the first sealant 500 onto the protective layer 300 preferably lines up with the one side of the protective layer 300. As shown in FIG. 2A, the cross section of the first sealant 500 forms a substantially rectangular shape. The contact width between the first sealant 500 and the activation layer 110 will be similar to the contact width between the first sealant 500 and the protective layer 300. The outer surface of the first sealant 500 substantially forms the vertical façade on the protective layer 300. The first sealant 500 is preferably distributed into the gap between the protective layer 300 and the activation layer 110, acting as a filling. In other words, the length of the protective layer 300 is greater than the length of the electrophoretic display layer 200 such that the electrophoretic display layer 200 is encased within the protective layer 300 and the activation layer 110. The distribution of the first sealant 500 and the subsequent connection formed between the first sealant 500 with the protective layer 300 and the activation layer 110 allows the electrophoretic display structure to accomplish the goal of firstly stopping gas from infiltrating the waterproof layer 210 or the electrophoretic display elements 250. However, as shown in the embodiment in FIG. 3, a side of the first sealant 500 may be exposed to the outside or protrude outward from a side of the protective layer 300 in order to increase the contact surface area with the activation layer 110 or the substrate 100. As shown in FIG. 3, the cross section of the first sealant 500 forms a trapezoidal shape. The contact width between the first sealant 500 and the activation layer 110 is greater than the contact width between the first sealant 500 and the protective layer 300, while the outward facing surface of the first sealant 500 forms an inclined surface with a particular angle with the protective layer 300.

As shown in FIGS. 2A and 3, the second sealant 700 covers the outer side of the first sealant 500 while connecting with the activation layer 110 and the protective layer 300. In this manner, the present embodiment can provide better waterproofing effects by being able to accomplish the goal of secondly stopping water vapors from infiltrating into the electrophoretic display layer 200. However, in other different embodiments, the second sealant 700 may cover the outer side of the first sealant 500 and connect with the substrate 100 and the protective layer 300 if the substrate 100 is a flexible circuit board or any other related directly distributed circuit substrates. As shown in the embodiments in FIGS. 2A and 3, the second sealant 700 is preferably distributed on the surface of the activation layer 110 as well as on the side of the protective layer 300, wherein one end of the second sealant 700 is flushed to the outside of the top surface 302 of the protective layer 300 and the other end is flushed to the outside of the activation layer 110. In other words, the projection onto the outside of the top surface 302 of the one end of the second sealant 700 lines up with the outside of the top surface 302. The projection onto the outside of the activation layer 110 of the other end lines up with the outside of the activation layer 110. Therefore, the outer surface of the second sealant 700 of the present embodiment is preferably an inclined surface. However, in other different embodiments, the outer surface of the second sealant 700 may be a surface vertical to the activation layer 110 or may be according to requirements other surfaces such as flat or curved surfaces.

As shown in the embodiment in FIG. 2A, since the outer surface of the first sealant 500 forms a vertical surface, a contact surface between the second sealant 700 and the first sealant 500 will therefore also form a vertical surface. As shown in FIG. 2A, the cross section of the second sealant 700 will form a substantially triangle or trapezoidal shape. The cross sectional width of the second sealant 700 increases along the direction from the protective layer 300 to the activation layer 110. In the embodiment shown in FIG. 3, since the outer surface area of the first sealant 500 forms an inclined surface, a contact surface between the second sealant 700 and the first sealant 500 will also be correspondingly formed inclined, wherein this contact surface is or very substantially is parallel to the outer surface of the second sealant 700. As shown in FIG. 3, the cross sectional width of the second sealant 700 preferably maintains the same or very substantially the same width in between the protective layer 300 and the activation layer 110.

Figure 4:
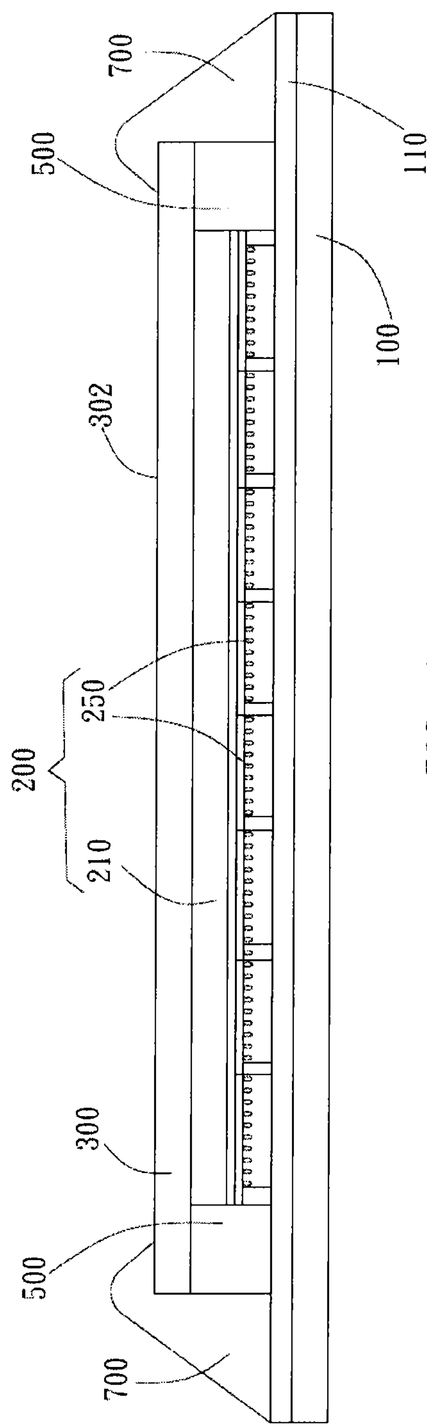
FIG. 4 is a cross-sectional view of the second embodiment of the electrophoretic structure of the present invention.

As shown in an embodiment in FIG. 4, the cross sectional shape of the first sealant 500 and the second sealant 700 is similar to the embodiment shown in FIG. 2, wherein the difference between the two embodiments lies in that an end of the second sealant 700 may further cover the top surface of the protective layer 300 to increase the adhesiveness and decrease the chance of gas from infiltrating in. In the embodiment shown in FIG. 4, the end of the second sealant 700 covering the top surface 302 of the protective layer 300 preferably has a shape of roughly smooth triangle. However, in different embodiments, the shape may include round shapes, arc shapes, or any other irregular shapes. In addition, the design of the second sealant 700 extending to cover the top surface of the protective layer 300 may also be applied to the embodiment in FIG. 3 or any other embodiments. After the first sealant 500 is coated or injected between the activation layer 110 and the protective layer 300, the second sealant 700 is then coated or disposed on the outer surface of the first sealant 500. The second sealant 700 is intimately adhered to the activation layer 110 and the protective layer 300. The viscosity of the first sealant 500 in liquid state is preferably lower than the viscosity of the second sealant 700 in liquid state. In the present embodiment, the viscosity of the first sealant 500 in liquid state is preferably smaller than or equal to 5000 cp (note: cp is short-form notation for Centipoise, 1 P=1 $g \cdot s^{-1} \cdot cm^{-1}$, viscosity unit: $Pa \cdot s = kg \cdot m^{-1} s^{-1}$, therefore 1 Pa·s=10 P=1000 cP), and the viscosity of the second sealant 700 in liquid state is preferably greater than or equal to 15000 cp. In addition, the water vapor transmission rate (WVTR) of the first sealant 500 in liquid state is higher than the water vapor transmission rate of the second sealant 700 in liquid state. However, in other different embodiments, the viscosity of the first sealant 500 in liquid state may be between 1500 cp to 3000 cp, while the viscosity of the second sealant 700 in liquid state may be between 46000 cp to 53000 cp.

Moreover, the first sealant 500 or the second sealant 700 of the double layered frame design of the present invention may be formed from resins, fillers, hardeners, initiators, or any other materials with different mixing ratio. In short, if the material for the first sealant 500 or the second sealant 700 is chosen from the above mentioned materials with different mixing ratio, the viscosity will correspondingly change. In a preferred embodiment, if the ratio of the added ingredients is roughly 20-50% resin, less than 10% filler, 10-50% amine hardener, and less than 1% other materials (such as rheological agent, diluting agent, wetting agent, etc.), then the mixture has low viscosity in liquid state and pertains to the first sealant 500. If the ratio of the added ingredients is roughly 30-70% resin, less than 10% filler, 10-50% amine hardener, and less than 1% other materials, then the mixture has high viscosity in liquid state and pertains to the second sealant 700.

Figure 5:
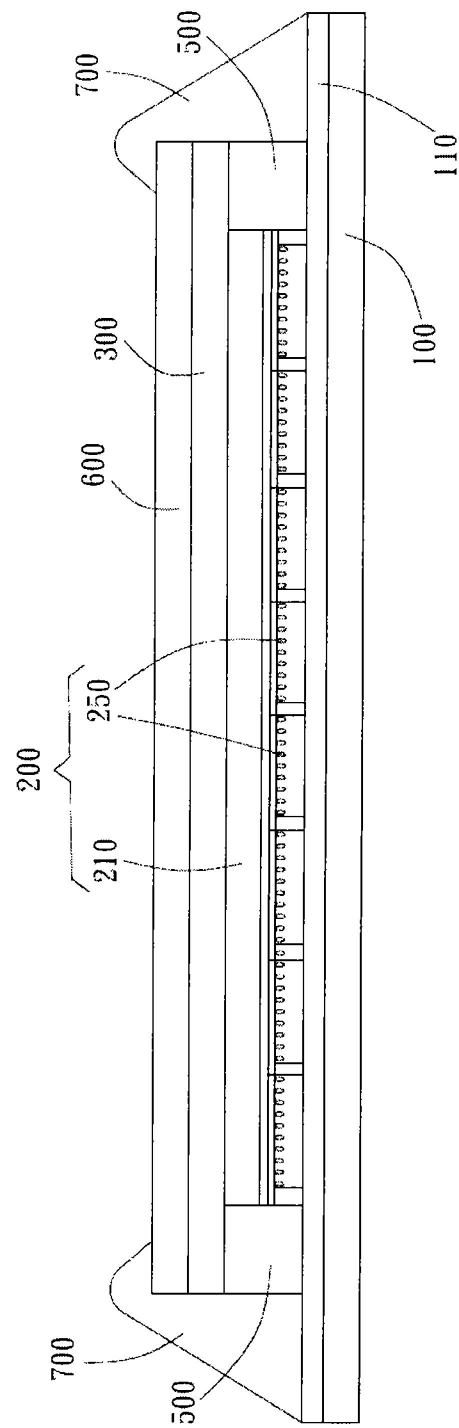
FIG. 5 is a cross-sectional view of the third embodiment of the electrophoretic structure of the present invention.

As shown in FIG. 5, in the present embodiment, a contact layer 600 may further be disposed on the protective layer 300. Typically, touch panels, anti-glare layers, or other suitable materials may be used for the contact layer 600. As shown in the embodiment in FIG. 5, the second sealant 700 preferably covers the upper surface of the contact layer 600.

The following describes the electrophoretic display structure manufacturing method of the present invention.

Figure 6:
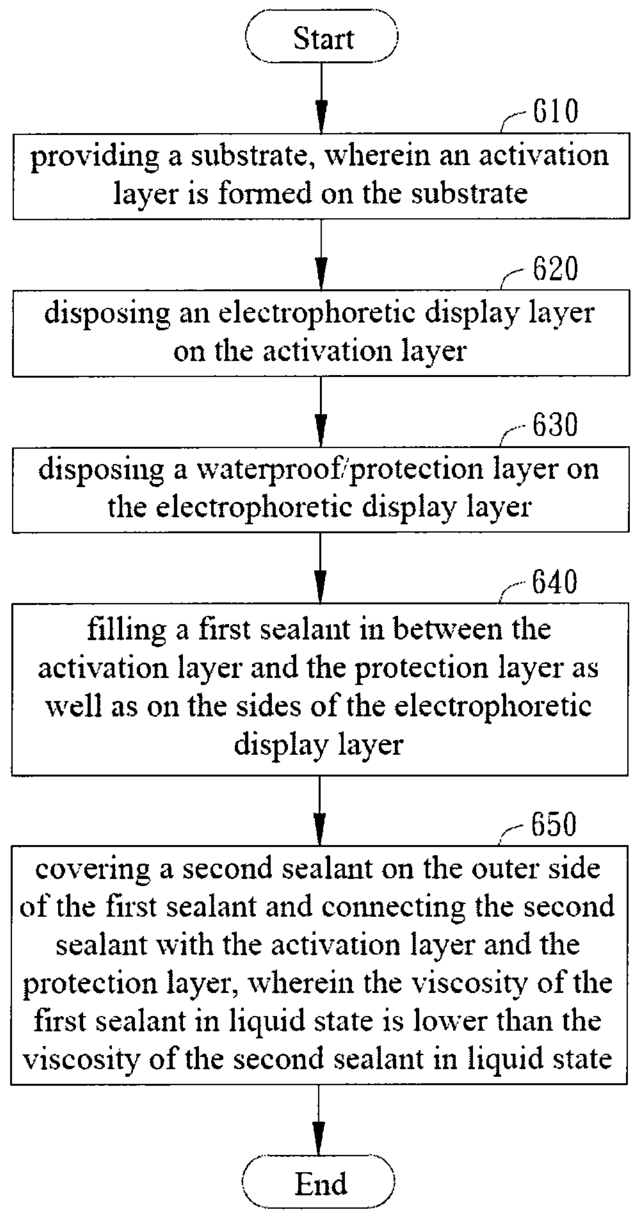
FIG. 6 is a flowchart diagram of an embodiment of the electrophoretic display structure manufacturing method of the present invention.

As shown in FIG. 6, the electrophoretic display structure manufacturing method includes the following steps. Step 610 includes providing a substrate, wherein an activation layer is formed on the substrate. Step 620 includes disposing an electrophoretic display layer on the activation layer. Step 630 includes disposing a waterproof/protection layer on the electrophoretic display layer. The dimension of the waterproof layer is preferably greater than or equal to the dimension of the electrophoretic display layer, while the dimension of the protective layer is greater than the dimension of the electrophoretic display layer. Step 640 includes filling a first sealant in between the activation layer and the protection layer as well as on the sides of the electrophoretic display layer. Step 650 includes covering the second sealant on the outer side of the first sealant and connecting the second sealant with the activation layer and the protective layer, wherein the viscosity of the first sealant in liquid state is lower than the viscosity of the second sealant in liquid state. In the present embodiment, the water vapor transmission rate (WVTR) of the first sealant is preferably higher than the water vapor transmission rate (WVTR) of the second sealant. The water absorbency of the second sealant is preferably smaller than the water absorbency of the first sealant. In particular, the viscosity of the first sealant in liquid state is smaller than or equal to 5000 cp, while the viscosity of the second sealant in liquid state is greater than or equal to 15000 cp. However, in other different embodiments, the viscosity of the first sealant in liquid state may be between 1500 cp to 3000 cp, while the viscosity of the second sealant in liquid state may be between 46000 cp to 53000 cp.

In addition, the method in steps 620 and 630 of disposing the electrophoretic display layer on the activation layer and/or disposing the protective layer on the electrophoretic display layer includes disposing methods such as adhering, coating, electroplating, or any other suitable methods. During step 640 of filling the first sealant in between the activation layer and the protective layer, the first sealant with the low viscosity may be regarded as a filler to fill the gaps around the electrophoretic display layer. Step 650 may regard the second sealant with high viscosity as the waterproof layer. In addition to stopping water vapor from infiltrating the electrophoretic display layer, the issue of bubble or hole formations in the structure may also be solved.

Figure 7:
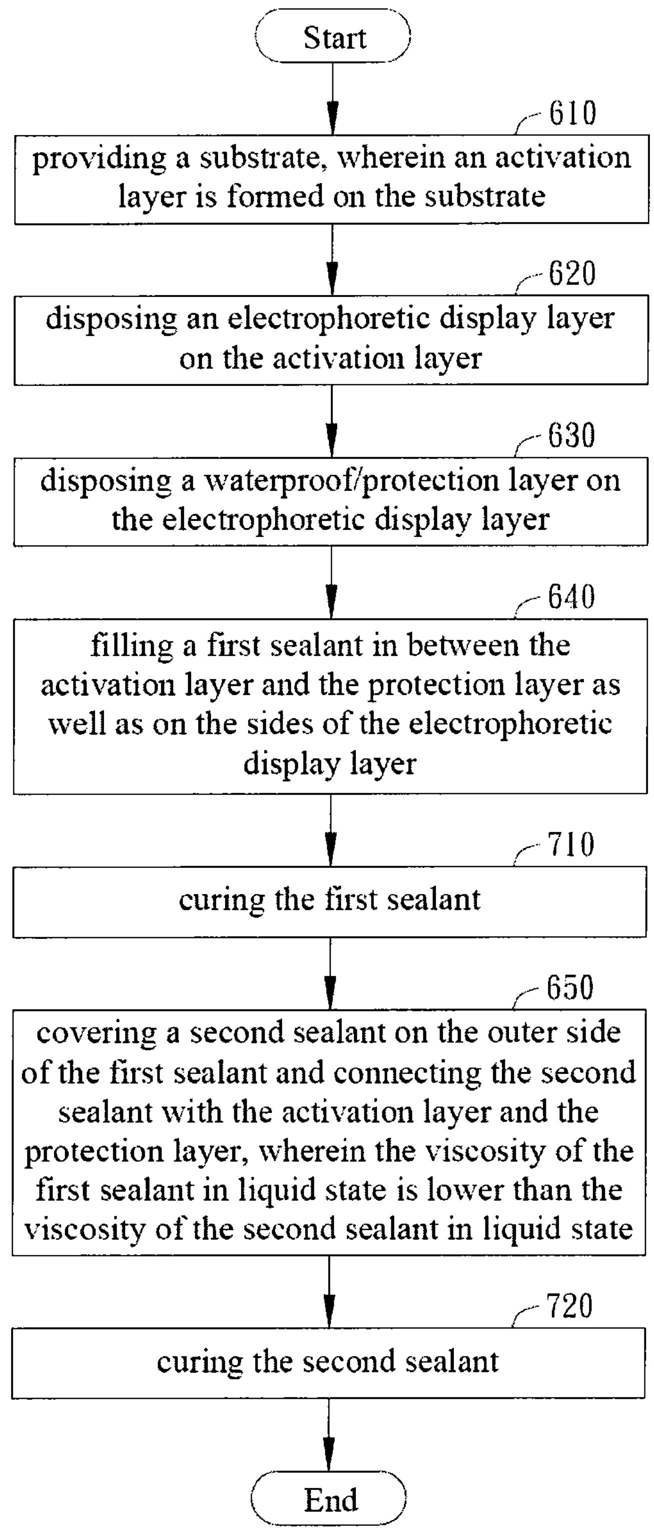
FIG. 7 is a flowchart diagram of another embodiment of the electrophoretic display structure manufacturing method of the present invention.

As shown in FIG. 7, in the present embodiment in between steps 640 and 650, the electrophoretic display structure manufacturing method further includes a step 710 of curing the first sealant and then thereafter covering the outer side of the cured first sealant with the second sealant. Step 720 includes curing the second sealant, completing the electrophoretic display structure manufacturing process.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An electrophoretic display structure, comprising:

a substrate;

an activation layer disposed on the substrate;

an electrophoretic display layer disposed on the activation layer;

a waterproof layer disposed on the electrophoretic display layer, wherein the dimension of the waterproof layer is greater than or equal to the dimension of the electrophoretic display structure;

a protective layer disposed on the waterproof layer, wherein the dimension of the protective layer is greater than the dimension of the waterproof layer;

a first sealant, disposed between the activation layer and the protective layer, filling the sides of the electrophoretic display layer; and a second sealant covering an outer side of the first sealant and connecting with the activation layer and the protective layer, wherein the viscosity of the first sealant in liquid state is lower than the viscosity of the second sealant in liquid state.

2. The electrophoretic display structure of claim 1, wherein the electrophoretic display layer has a plurality of electrophoretic display elements.

3. The electrophoretic display structure of claim 1, wherein the water vapor transmission rate (WVTR) of the first sealant is higher than the water vapor transmission rate of the second sealant.

4. The electrophoretic display structure of claim 1, wherein a projection onto the protective layer of one side of the second sealant lines up with one side of the protective layer.

5. The electrophoretic display structure of claim 4, wherein the second sealant connected to the protective layer covers a top surface of the protective layer.

6. The electrophoretic display structure of claim 1, wherein a projection onto the protective layer of one side of the first sealant lines up with one side of the protective layer, and an outer surface of the first sealant forms a substantially vertical façade on the protective layer.

7. The electrophoretic display structure of claim 6, wherein a cross sectional width of the second sealant increases in a direction from the protective layer to the activation layer.

8. The electrophoretic display structure of claim 1, wherein an outer side of the first sealant protrudes from the side of the protective layer and a contact width between the first sealant and the activation layer is greater than a contact width between the first sealant and the protective layer, and an outward facing surface of the first sealant forms an inclined surface with a particular angle with the protective layer.

9. The electrophoretic display structure of claim 8, wherein an outer surface of the second sealant is parallel to a contact surface between the second sealant and the first sealant.

10. The electrophoretic display structure of claim 1, wherein the viscosity of the first sealant is smaller than or equal to 5000 cp.

11. The electrophoretic display structure of claim 1, wherein the viscosity of the second sealant is greater than or equal to 15000 cp.

12. An electrophoretic display structure manufacturing method, comprising: providing a substrate having an activation layer formed thereon; disposing an electrophoretic display layer on the activation layer; disposing a waterproof layer on the electrophoretic display layer, wherein the dimension of the waterproof layer is greater than or equal to the dimension of the electrophoretic display layer; filling a first sealant in between the activation layer and a protective layer disposed on the waterproof layer as well as the sides of the electrophoretic display layer; covering a second sealant on an outer side of the first sealant and connecting the second sealant to the activation layer and the protective layer, wherein the viscosity of the first sealant in liquid state is lower than the viscosity of the second sealant in liquid state; and curing the first sealant and the second sealant.

13. The electrophoretic display structure manufacturing method of claim 12, wherein the water vapor transmission rate (WVTR) of the first sealant is higher than the water vapor transmission rate of the second sealant.

14. The electrophoretic display structure manufacturing method of claim 12, wherein the water absorbency of the second sealant is smaller than the water absorbency of the first sealant.

15. The electrophoretic display structure manufacturing method of claim 12, wherein the viscosity of the first sealant in liquid state is smaller than or equal to 5000 cp.

16. The electrophoretic display structure manufacturing method of claim 12, wherein the viscosity of the second sealant in liquid state is greater than or equal to 15000 cp.

17. The electrophoretic display structure manufacturing method of claim 12, further comprising a step of disposing a protection layer on the electrophoretic display layer, wherein the dimension of the protection layer is greater to the dimension of the waterproof layer.

18. The electrophoretic display structure of claim 1, wherein the protective layer protects the waterproof layer.

* * * * *